Patented Jan. 10, 1950

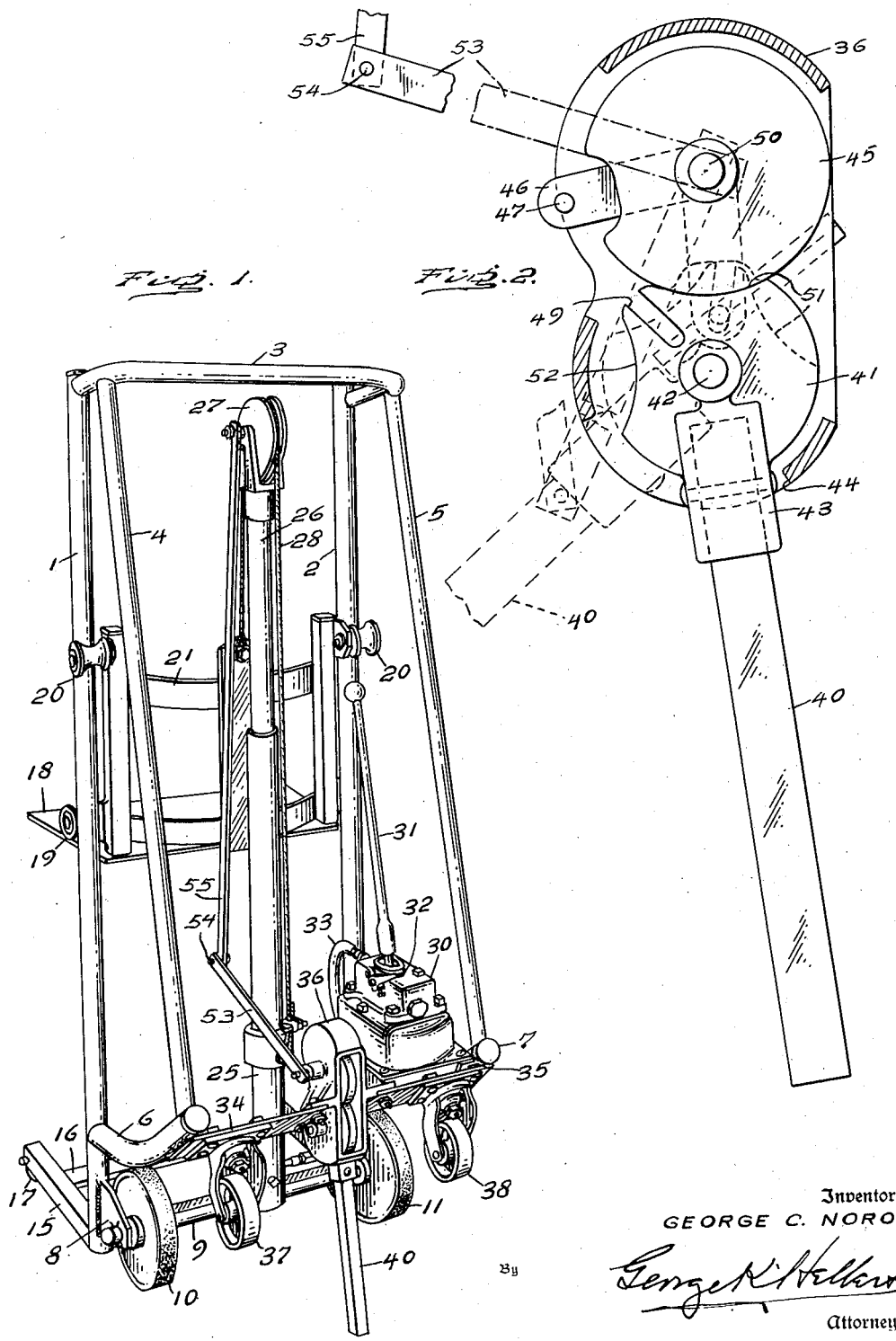

2,493,824

UNITED STATES PATENT OFFICE 2,493,824

INDUSTRIAL HAND TRUCK

George C. Noros, Manheim, Pa., assignor to Bond Foundry & Machine Company, Manheim, Pa., a corporation of Pennsylvania Application February 14, 1948, Serial No. 8,390

8 Claims. (Cl. 187—9)

This invention relates to industrial hand trucks and the like, particularly of the type known as elevating or lift trucks in which a movable platform or load support carried by a wheeled frame is associated with mechanism whereby it may be raised on the frame to elevate a load of material to a raised unloading point or to receive material from such point and lower it, the truck as a whole being adapted for movement about the floor of a warehouse, factory or the like for transporting the load from place to place.

Many kinds of trucks intended for such purposes are in use but as far as I am aware none of them has been entirely satisfactory, and it is a principal object of the present invention to provide an improved hand truck embodying certain novel features whereby convenience of use and safety of the operator and of the material loaded on the truck are enhanced.

A further object is to provide a truck of the general character described comprising a novel automatically actuated safety device whereby when the truck is tilted on its supporting wheels to loading or unloading position and its movable platform raised so as to jeopardize its normal stability the safety device is brought into play to avoid the danger of the truck toppling over due to the unbalancing effect of the elevated load.

Other objects, purposes and advantages of the invention will hereafter more fully appear or will be understood from the following description of a preferred embodiment of it, reference being had to the accompanying drawing in which:

Fig. 1 is a rear perspective view of the truck with its movable platform partially raised and in position to receive a load; and Fig. 2 is an enlarged fragmentary vertical section of the actuating mechanism and associated parts of the safety device to which reference has been made.

More particularly, as shown in Fig. 1, the truck comprises a main frame which may be constructed principally from tubular members welded together including upright guide posts 1, 2, a broad U-shaped upper cross member 3, which forms a convenient handle for moving the truck about, and side stays 4, 5 extending angularly to the posts and connecting the upper cross member with stringers 6, 7 projecting rearwardly from the posts near their lower ends. Below the stringers the posts are supported on brackets 8, of which but one appears in the drawing, secured to an axle 9 carrying main wheels 10, 11 which if desired may be provided with resilient tires.

A front base frame comprising parallel side rails 15 interconnected at their outer ends by a cross brace 16 and having auxiliary wheels 17 at their outer ends projects forwardly from the lower extremities of the guide posts and a platform 18 is arranged to travel on the latter through the medium of concave rollers 19, 20 respectively disposed in front of and behind the posts and journaled on a platform carriage 21 to which the platform is secured.

For raising and lowering this carriage, and hence the platform and any load disposed thereon, I provide an hydraulic ram cylinder 25, supported at its lower end from axle 9 and carrying at the head of its plunger 26 a sheave 27 over which runs a flexible cable 28 secured at its ends respectively to the platform carriage and to the cylinder, the flow of fluid into and from the latter to raise or lower the carriage being controlled by a suitable pump 30, operated by a hand lever 31, and a valve in the pump housing actuated by a lever 32, a hose 33 or other suitable conduit for the fluid connecting the pump with the cylinder.

Welded to the rear ends of stringers 6, 7 is a cross member comprising two plate sections 34, 35 which supports a housing 36 midway of its ends, and casters 37, 38 are carried by the plates proximate the rear corners of the main frame to sustain a part of the load when the truck is tilted rearwardly for movement about the floor, these casters being raised from the floor when the truck is in the loading and unloading position illustrated in Fig. 1.

Housing 36 contains mechanism whereby a movable foot 40 is swung to effective safety position as shown in full lines in Figs. 1 and 2 when the carriage and platform are raised, and to inoperative position (dotted lines in Fig. 2) when they are lowered and it is desired to tilt the truck rearwardly on its axle 9 preparatory to moving it about. More specifically this mechanism comprises a radially slotted and peripherally arcuately recessed driven wheel 41 journaled in housing 36 on a pintle 42 and having secured to it a socket 43 which projects through a closed slot 44 in the housing and receives the upper end of foot 40. A cooperative driving wheel 45 including an arm 46 carrying a pin 47 adapted to engage in a slot 49 in wheel 41 is also journaled in the housing on a pintle 50 and its periphery, save in the vicinity of the pin where wheel 45 is cut away to provide an appropriate clearance, interfits with an arcuate recess 51 in wheel 41 which extends from adjacent the mouth of slot 49 in an arc of the same radius as the major portion of wheel 45. Another recess 52 may be provided oppositely and similarly to recess 51 but in the truck shown it is not essential that the periphery of wheel 45 actually engage in this second arc. A lever 53 mounted on pintle 50 projects forwardly from the housing and is pivoted by a pin 54 to the lower end of a link 55 the upper end of which is pivotally secured to the ram plunger adjacent the axis of sheave 27 whereby the link is caused to follow the movements of the plnuger and the lever is correspondingly actuated.

It will be apparent from Fig. 2 that when link 55, lever 53 and wheel 45 move from their full to their dotted line positions driven wheel 41 and foot 40 attached to it move accordingly through the intermeshing of pin 47 with slot 49. Thus the dotted line positions correspond to the lowered position of the platform and foot 40 is therefore swung up under the frame, being held in this inoperative position by engagement of pin 47 in slot 49. When the platform is now raised even only a little to move lever 53 and hence wheel 45 and pin 47 clockwise, the action of pin 47 in slot 49 swings foot 40 to operative or full line position and subsequent further upward movement of the platform after pin 47 has cleared slot 49, still moving clockwise, has no effect on the foot, which therefore remains locked in operative position through engagement of the periphery of wheel 45 in recess 51 of wheel 41 no matter to what height the platform is ultimately elevated. Of course on return movement of the platform these operations are reversed and the foot is thus restored to inoperative position just as the platform reaches the bottom of its travel.

The actuating mechanism for foot 40 thereby provides substantially a segmental or oscillatory Geneva movement in which the operative limit position of the driven elements, namely wheel 41 and the foot 40, is fixed and is unaffected by the rotative position of the driving elements, i. e. wheel 45 and pin 47, after the pin has moved out of slot 49 on initial raising of the platform; the latter may therefore be raised only partially as in Fig. 1 or to the full height of its guide posts without modifying the positioning of foot 40 which consequently remains fixed and ready by contact with the floor to counteract any tendency of the truck to topple over backwards.

It is apparent that when the truck is resting on its main and auxiliary wheels 10, 11 and 17 in substantially upright position, the center of gravity of platform 18 and any load disposed thereon is over the front base frame whether the platform be raised or lowered so there is little or no tendency for the truck to topple over in any direction although if the platform be raised only a little way foot 40 forms an added safeguard against rearward tilting such as might occur when the truck is being loaded from the front side. However, when a truck of this general kind is to be moved a material distance it is usual to incline the frame backwards about its supporting axle until the truck is supported on its main wheels and rear caster wheels, in which position if the platform be raised and heavily loaded the truck as a whole is extremely unstable; consequently whenever the truck is to be moved about in this manner the platform should be lowered to correspondingly lower its center of gravity and that of the load deposited on it. But in a truck embodying my improvements, whenever the platform is raised to any material extent above its lowermost position foot 40 is automatically brought to operative position and so blocks the rearward tilting of the truck whereas whenever the platform is lowered the foot, likewise automatically, is swung forward to inoperative position beneath the frame thus permitting the truck to be rearwardly tilted and affording entire freedom of movement in any direction. It therefore is impossible for a careless operative to bring the truck frame to a dangerous rearward inclination whenever the platform is raised although since when the truck is upright the foot is preferably slightly out of contact with the floor, it forms no obstacle to the truck being moved about for short distances on its main and auxiliary wheels.

It is thus evident the truck as a whole constitutes an extremely useful adjunct to an industrial establishment or the like in which material must be moved from place to place by other than power driven equipment, and that the risks incident to lack of stability in prior trucks of this general character are substantially obviated through the medium of the automatic stabilizing foot and its operating mechanism.

While I have herein described with considerable particularity one embodiment of the invention it will be understood I do not desire or intend to be limited or confined thereto or thereby in any way as changes and modifications in the form, construction and relationship of the several parts of the truck the mode of their operation and instrumentalities employed will readily occur to those skilled in the art and may be made if desired without departing from the spirit and scope of the invention as defined in the appended claims.

Having thus described my invention, I claim and desire to protect by Letters Patent of the United States:

1. A truck of the character described comprising a frame, coaxial supporting wheels therefor, a platform vertically movable on the frame, means operable to raise and lower the platform, a foot adapted for oscillatory movement engageable with the truck supporting surface when at one limit of its travel to prevent substantial rearward tilting of the frame about said axis, and means actuated by the platform moving means adapted to swing the foot to said limit position while the platform is being raised and to return it to its other limit position while the platform is being lowered.

2. A truck of the character described comprising a frame, coaxial supporting wheels therefor, a platform vertically movable on the frame, means operable to raise and lower the platform, a foot adapted for oscillatory movement engageable with the truck supporting surface when at one limit of its travel to prevent substantial rearward tilting of the frame about said axis, and means actuated by the platform moving means adapted to swing the foot to said limit position while the platform is being raised and then releasably lock it in said limit position and to unlock it and return it to its other limit position while the platform is being lowered.

3. A truck of the character described comprising a frame having forwardly and rearwardly extending parts adjacent its lower end, coaxial supporting wheels for the frame, a platform vertically movable on the frame, means operable to raise and lower the platform, an oscillatory foot extending in a generally downward direction from the rearwardly projecting part of the frame with its outermost end adapted for engagement with the truck supporting surface when the platform is raised to thereby restrain the truck from material rearward tilting about the axis of its wheels, and means actuated by the first mentioned means adapted as the platform is lowered to swing the foot from support engaging position to a position in which it extends beneath the rearwardly projecting part of the frame to thereby enable the frame to be tilted rearwardly through a greater arc about said axis.

4. In a truck of the character described comprising a tiltable frame, a movable platform carried thereby, means for moving the platform relatively to the frame and a pair of coaxial wheels supporting the frame, a movable foot adapted when in operative position to engage a supporting surface to inhibit tilting of the frame about the axis of said wheels in one direction, and means interconnected with the platform-moving means for moving the foot to said position when said means are actuated in one direction and for moving the foot out of said position when said means are actuated in the opposite direction.

5. In a truck of the character described comprising a tiltable frame, a movable platform carried thereby and means for moving the platform relatively to the frame, a foot pivoted on the frame adapted when in one position to engage a supporting surface to limit rearward tilting of the frame and in another position to permit such tilting, means for moving the foot from either of said positions to the other, and means interconnecting the foot moving means with the platform moving means for actuation thereby.

6. A truck of the character described comprising a frame, coaxial supporting wheels therefor, a platform vertically movable on the frame, a flexible tension member and a movable sheave supporting the platform, means for selectively raising and lowering the sheave, a foot adapted for oscillatory movement in a plane normal to the wheel axis engageable with a supporting surface when at one limit of its travel to restrain movement of the frame about said axis in a rearward direction, and means interconnecting the foot with the sheave for moving the foot to said limit while the sheave is being raised and to the opposite limit of its travel while the sheave is being lowered.

7. A truck of the character described comprising a frame, coaxial supporting wheels therefor, a platform vertically movable on the frame, a flexible tension member and a movable sheave supporting the platform, means for selectively raising and lowering the sheave, a foot adapted for oscillatory movement in a plane normal to the wheel axis engageable with a supporting surface when at one limit of its travel to restrain movement of the frame about said axis in a rearward direction, means interconnecting the foot with the sheave for moving the foot to said limit while the sheave is being raised and to the opposite limit of its travel while the sheave is being lowered, and means for maintaining the foot at the first mentioned limit until displaced therefrom by lowering of the sheave.

8. In a truck of the character described, a rigid foot pivoted for oscillatory movement with respect to the truck, a slotted wheel secured to the foot having an arcuately concave peripheral recess extending from the mouth of the slot, a second wheel rotatable in the plane of the first wheel, a pin carried by the second wheel adapted to enter the slot in the first wheel to oscillate the latter in correspondence with the rotative movements of the first wheel, the second wheel being adapted to enter said concave recess after the pin has moved the first wheel in one direction to thereby lock the first wheel against further rotation after the pin has been disengaged from the slot.

GEORGE C. NOROS.

REFERENCES CITED

The following references are of record in the file of this patent:

UNITED STATES PATENTS

| Number | Name | Date |
| --- | --- | --- |
| 613,336 | Toepfer | Nov. 1, 1898 |